(Model.)

J. B. CALKINS.
Car Door Bolt.

No. 234,240.  Patented Nov. 9, 1880.

ATTEST:
James M. Calkins
John Byron M. Calkins

INVENTOR:

UNITED STATES PATENT OFFICE.

JAMES B. CALKINS, OF PACIFIC, MISSOURI.

CAR-DOOR BOLT.

SPECIFICATION forming part of Letters Patent No. 234,240, dated November 9, 1880.

Application filed July 12, 1880. (Model.)

*To all whom it may concern:*

Be it known that I, JAMES B. CALKINS, a citizen of the United States, residing at Pacific, in the county of Franklin and State of Missouri, have invented a new and useful Machine for Locking and Bolting Freight-Car Doors, of which the following is a specification.

My invention relates to improvements in locking or bolting freight-car doors by means of a long bolt in conjunction with a bar or lever and notched fulcrum.

The object of my invention is to prevent car-doors from being unlocked while standing in a yard or in transit from one point to another, night or day, unless the person so unlocking the door climbs to the top of the car and passes along the center of the roof to the lever or bar, where his whole person is exposed to the view of those who are on the train, or those who are watching in a yard. I attain these objects by the mechanism illustrated in the accompanying drawings, in which—

Figure 1:
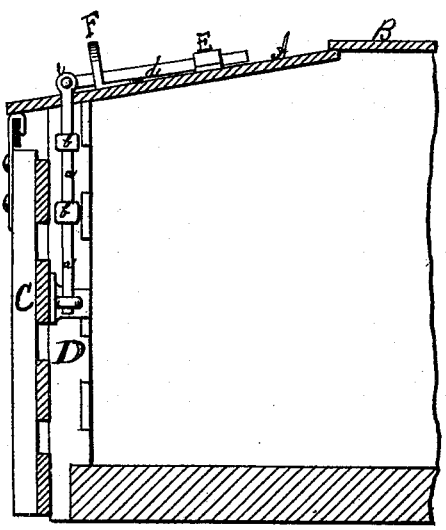
Figure 2:
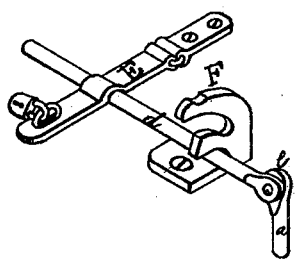

Figure 1 is a vertical section of the entire device. Fig. 2 is a top view of the same.

Similar letters refer to similar parts throughout the several views.

A of Fig. 1 represents the roof of the car. B of Fig. 1 represents the plank or walk on top of the car, where the brakeman walks over the train. C represents the door of car; D, door-post. $a\,a$, Fig. 1, represent the bolt passing through the roof A through sockets $b\,b$, attached to door-post C. $d$ represents a bar or lever attached to bolt $a\,a$ by hinge-joint $e$, and locked by hasp E, which prevents bar $d$ from being moved to the right or left, while the lower notch in fulcrum F prevents the bolt $a\,a$ from being raised and the door from being unlocked.

To unlock the door, open the hasp E, swing the lever out of the lower notch of fulcrum F, Fig. 2, and place it in the upper notch of the fulcrum and press down on lever $d$ to raise the bolt, or raise the lever to force the bolt down.

I am aware that prior to my invention bolts have been used to fasten car-doors; but I combine the bolt with the lever, fulcrum-hasp, and hinge, for which I desire to secure Letters Patent.

What I claim is—

1. In bolts, the combination of the lever or bar $d$, the notched fulcrum F, and the hinge-joint $e$.

2. The combination of the lever or bar $d$, hasp E, notched fulcrum F, joint $e$, bolt $a$, passing through the roof A of the car, and the sockets $b\,b$, all substantially as set forth, for the purpose specified.

JAMES B. CALKINS.

Witnesses:
 JAMES M. CALKINS,
 JOHN BYRON M. CALKINS.